Aug. 2, 1955 N. J. FOKAKIS 2,714,348
AUTOMATIC TOASTER
Filed April 3, 1950 2 Sheets-Sheet 1

Nicholas J. Fokakis
INVENTOR.

BY *Clarence A. O'Brien
and Harvey B. Jacobson*
Attorneys

Aug. 2, 1955 N. J. FOKAKIS 2,714,348
AUTOMATIC TOASTER
Filed April 3, 1950 2 Sheets-Sheet 2

Nicholas J. Fokakis
INVENTOR.

BY Clarence A. O'Brien
and Harvey B. Jacobson
Attorneys

United States Patent Office 2,714,348
Patented Aug. 2, 1955

2,714,348

AUTOMATIC TOASTER

Nicholas J. Fokakis, Mobile, Ala.

Application April 3, 1950, Serial No. 153,640

2 Claims. (Cl. 99—387)

This invention relates to new and useful improvements and structural refinements in automatic toasters for slices of bread, or the like, and the principal object of the invention is to facilitate convenient and highly expeditious performance of the toasting operation.

The above object is achieved by the provision of an electrically heated oven through which slices of bread are carried by an endless conveyor, an important feature of the invention residing in the provision of a magazine from which slices of bread are automatically delivered to the conveyor for subsequent travel through the heated oven.

Another feature of the invention resides in the specific structural arrangement of the conveyor which facilitates carrying of slices of bread so that the side surfaces thereof are parallel to the plane of movement of the conveyor, thus facilitating a more efficient arrangement of the heating means in the oven to assure proper radiation and distribution of heat on both side surfaces of each slice.

Some of the advantages of the invention reside in its simplicity of construction, in its efficient and expeditious operation as aforesaid, in its durability and in its adaptability to economical manufacture.

With the above more important objects and features in view and such other objects and features as may become apparent as this specification proceeds, the invention consists essentially in the construction and arrangement of parts as shown in the accompanying drawings, in which.

Like characters of reference are employed to designate like parts in the specification and throughout the several views.

Figure 1:
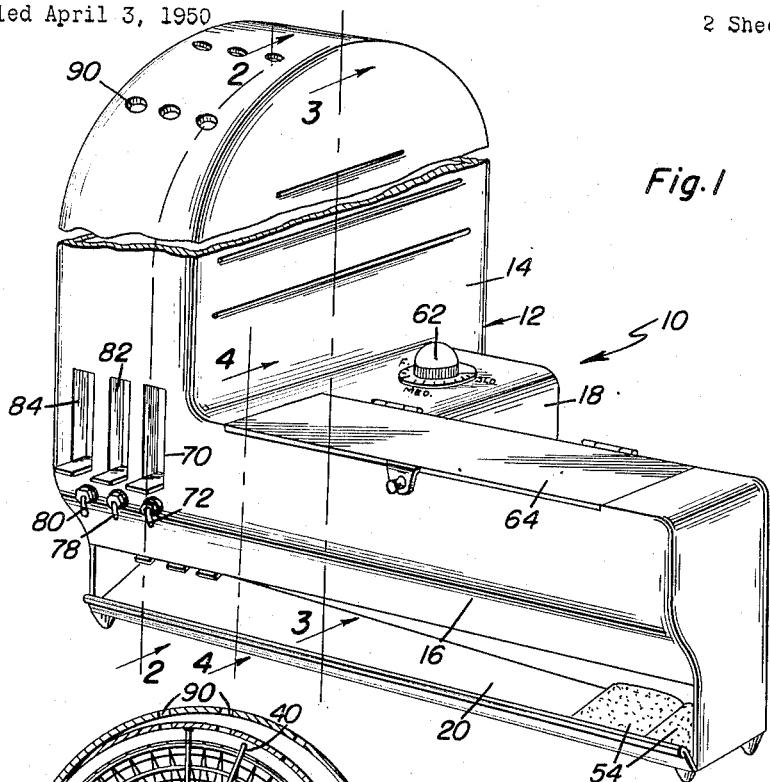
Figure 1 is a perspective view of the invention.

Referring now to the accompanying drawings in detail, the invention consists of an automatic toaster which is designated generally by the reference character 10 and embodies in its construction a suitable housing 12 affording a vertically elongated oven 14, a horizontally elongated magazine 16 which extends laterally from the oven, and a motor box 18 disposed at the junction of the oven and the magazine, as is best shown in Figure 1.

In addition, the housing 12 also affords a sloped delivery chute 20 which extends longitudinally under the hopper 16 and connects at its relatively high or upper end with a sloped plate 22 provided at the bottom of the oven 14, whereby toasted slices of bread dropping downwardly from the oven on the plate 22 may gravitate along the delivery chute 20, as will be clearly apparent.

Figure 2:
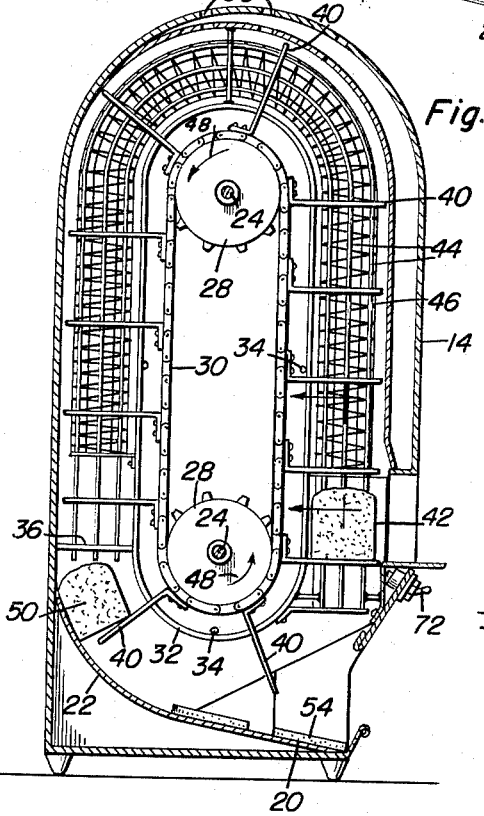
Figure 2 is a fragmentary vertical sectional view thereof, taken substantially in the plane of the line 2—2 in Figure 1.

A pair of horizontal shafts 24 extend transversely through the oven 14 and are journaled, in vertically spaced relation, in suitable bearings 26, the shafts 24 having secured thereto a pair of sprockets 28 carrying an endless conveyor chain 30. The chain 30 is movable in a vertical plane in the oven 14, and a case 32 is mounted in the oven by suitable brackets 34 and extends around the chain, as is best shown in Figure 2.

The case 32 is provided with a continuous slot 38 which is in register with the chain 30, and a plurality of elongated elements 40 are secured at longitudinally spaced points to the chain 30 and project outwardly from the case 32 through the slot 38.

The members 40 are adapted to engage slices of bread 42 which are to be toasted, and it is to be noted that the slices of bread are placed on the members 40 so that the side surfaces thereof are parallel to the plane of movement of the conveyor 30, in which manner the two sides of the bread are most effectively exposed to application of heat for efficient toasting.

Sets of guide rods 44, secured to the case 32 by means of brackets 36, are provided at the opposite sides of the members 40 so as to sustain the slices of bread in position on the members during their travel through the oven, and a suitable heating element or elements 46 are carried by the guide rods at the opposite sides of the members 40, so that the slices of bread are toasted while travelling through the oven on the conveyor, the latter being motivated in the manner hereinafter described so as to travel in the direction of the arrows 48.

Needless to say, when the slices of bread leave the oven as indicated at 50 in Figure 2, they slide downwardly along the plate 22, as indicated at 52, and finally gravitate to the lower end of the delivery trough 20, as indicated at 54 in Figure 1.

The conveyor 30 is motivated by an electric motor 56 mounted in the motor box 18 and connected through the medium of suitable reduction gearing 58 to the lower of the shafts 24, the motor 56 deriving its supply of current from a power line 60 through a rheostat 62 which is mounted on the motor box 18 for controlling the speed of the toasting operation, or, more particularly, for controlling the rate of travel of the bread through the machine.

Figure 4:
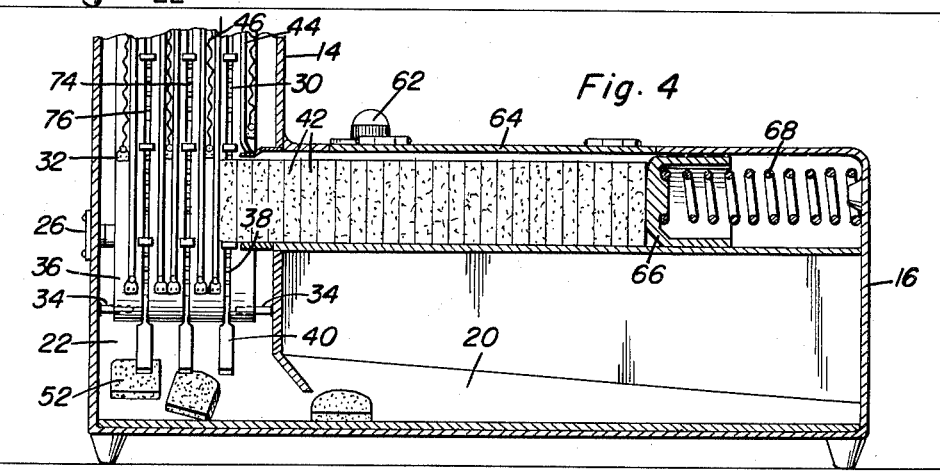
Figure 4 is a fragmentary sectional view, taken substantially in the plane of the line 4—4 in Figure 1.

The aforementioned magazine 16 is provided at the top thereof with an openable door or cover 64 so that slices of bread 42 which are to be toasted may be inserted in the magazine, as illustrated in Figure 4. A follower 66, pressed by a spring 68, is slidable in the magazine for the purpose of delivering one slice after another from the magazine to the members 40 of the conveyor 30. A vertically elongated opening 70 may be provided in the front wall of the oven 14 so that slices of bread may be inserted into the oven manually when the use of the magazine 16 is not desired. Moreover, the provision of the opening 70 will facilitate clearing of any obstruction such as may present itself when slices of bread are delivered in the oven from the magazine by spring pressure.

The heating element or elements 46 are also connected to the main line 60 through the medium of a suitable switch 72 provided on the oven 14 under the opening 70, and if desired the oven may be sufficiently wide to accommodate additional conveyor units 74, 76, etc., driven by the motor 56 simultaneously with the conveyor unit 30.

The heating elements of the conveyor units 74, 76 are controlled for independent operation by additional switches 78, 80 mounted adjacent the aforementioned switch 72, and while the conveyor unit 30 is primarily intended to receive its supply of bread from the magazine 16, the conveyor units 74, 76 are primarily intended to be loaded manually through suitable openings 82, 84 provided in the oven 14 adjacent the opening 70.

Figure 6:
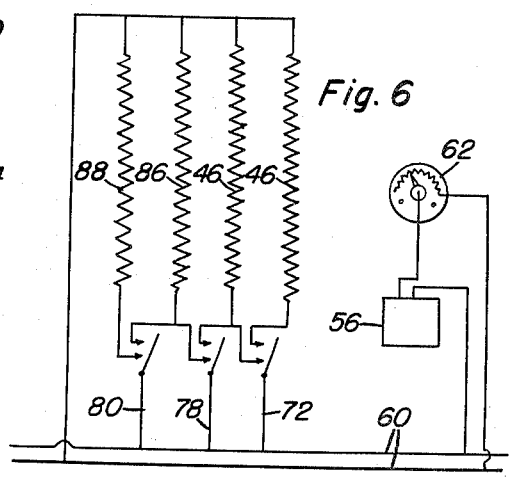
Figure 6 is a wiring diagram of the electrical components of the invention.
Figure 3:
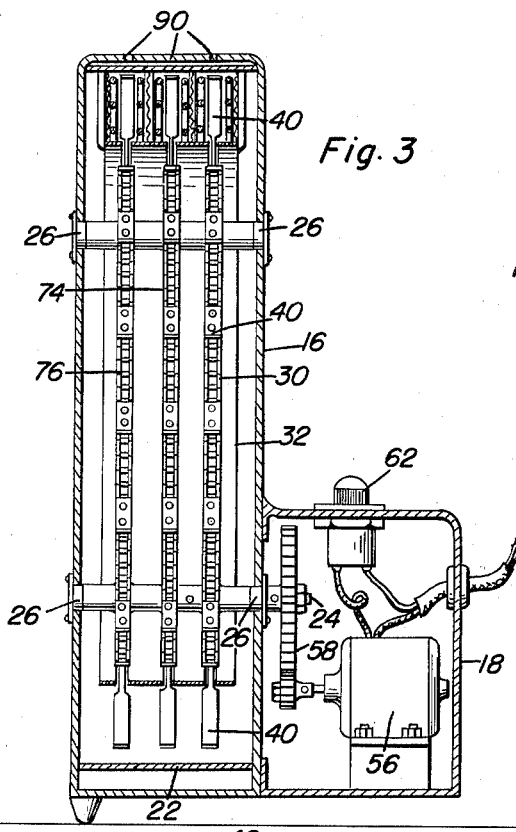
Figure 3 is a vertical sectional view, taken substantially in the plane of the line 3—3 in Figure 1.
Figure 5:
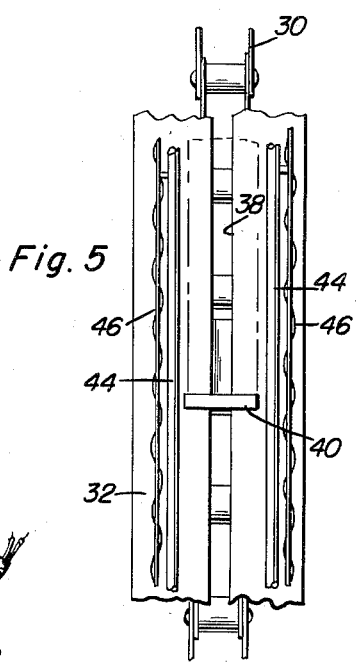
Figure 5 is a fragmentary sectional view.

The heating elements of the conveyor units 74, 76 are designated respectively by the reference characters 86, 88 in Figure 6.

It is to be noted that the upper portion of the oven 14 is provided with a plurality of ventilating openings 90, substantially as shown.

It is believed that the advantages and use of the invention will be clearly understood from the foregoing disclosure, and accordingly, further description thereof at this point is deemed unnecessary.

While in the foregoing there has been shown and described the preferred embodiment of the invention, it is to be understood that minor changes in details of construction and arrangement of parts may be resorted to without departing from the spirit and scope of the invention as claimed.

Having described the invention, what is claimed as new is:

1. An automatic toaster comprising a vertically elongated housing having a pair of spaced side walls interconnected by a peripheral wall forming front, rear, top and bottom surfaces thereof, a pair of vertically spaced shafts journalled between said side walls and each having a sprocket secured thereto, an endless chain trained over said sprockets, a casing wall disposed between said peripheral wall and said chain and surrounding the latter, a plurality of bread slice guiding frames secured to and extending between said casing and peripheral walls, said casing including a pair of spaced juxtaposed sections affording a slot therebetween, a plurality of heating elements secured to said frames on opposite sides of said slot, a set of elongated bread slice engaging members secured at longitudinally spaced points to said chain and radiating outwardly therefrom through the slot in said casing wall and between said heating elements.

2. An automatic toaster comprising a vertically elongated housing having a pair of spaced side walls interconnected by a peripheral wall forming front, rear, top and bottom surfaces thereof, a pair of vertically spaced shafts journalled between said side walls and each having a sprocket secured thereto, an endless chain trained over said sprockets, a casing wall disposed between said peripheral wall and said chain and surrounding the latter, a plurality of bread slice guiding frames secured to and extending between said casing and peripheral walls, said casing including a pair of spaced juxtaposed sections affording a slot therebetween, a plurality of heating elements secured to said frames on opposite sides of said slot, a set of elongated bread slice engaging members secured at longitudinally spaced points to said chain and radiating outwardly therefrom through the slot in said casing wall and between said heating elements, a horizontally elongated magazine extending laterally from one side wall and communicating therethrough adjacent said bread slice engaging members, said housing having an opening in its lower portion, and a chute below said magazine and extending through said opening beneath said endless chain to receive toasted bread slices falling therefrom.

References Cited in the file of this patent

UNITED STATES PATENTS

| | | |
|---|---|---|
| 1,538,864 | Morrison | May 19, 1925 |
| 1,543,737 | Thornton | June 30, 1925 |
| 1,807,312 | Henley | May 26, 1931 |
| 1,907,650 | McLelland et al. | May 9, 1933 |
| 2,001,703 | Brown | May 21, 1935 |
| 2,038,028 | De Matteis | Apr. 21, 1936 |
| 2,182,229 | Hamel | Dec. 5, 1939 |
| 2,186,807 | Neuberger | Jan. 9, 1940 |
| 2,369,274 | Beatty | Feb. 13, 1945 |

FOREIGN PATENTS

| | | |
|---|---|---|
| 589,109 | Great Britain | June 11, 1947 |